United States Patent [19]
Tsui

[11] Patent Number: 6,071,404
[45] Date of Patent: Jun. 6, 2000

[54] WATER TREATING DEVICE

[76] Inventor: Tommy Tsui, No. 102, Chung Ai Road, Tso Ying Dist., Kaohsiung, Taiwan

[21] Appl. No.: 09/144,636

[22] Filed: Aug. 31, 1998

[51] Int. Cl.[7] ............................. B01D 71/00; B01D 63/00; B01D 35/06; B01D 61/42; B01D 69/00; C02F 1/40; C02F 11/00; C02F 1/44; C25B 9/00
[52] U.S. Cl. ........................... 210/232; 210/243; 210/260; 210/321.69; 204/260; 204/263; 204/627; 204/640
[58] Field of Search ..................................... 210/636, 748, 210/192, 243, 256, 260, 321.69, 321.6, 232; 204/252, 260, 263, 627, 640, 344, 350; 422/29; 134/22.1, 22.11

[56] References Cited

U.S. PATENT DOCUMENTS

| 4,624,760 | 11/1986 | Pottinger et al. ....................... 205/712 |
| 5,759,489 | 6/1998 | Miura et al. .............................. 422/28 |

FOREIGN PATENT DOCUMENTS

| 200827 | 2/1993 | Taiwan . |
| 261134 | 10/1995 | Taiwan . |

*Primary Examiner*—Matthew O. Savage
*Assistant Examiner*—Richard W. Ward
*Attorney, Agent, or Firm*—Stevens, Davis, Miller & Mosher, L.L.P.

[57] ABSTRACT

A water treating device includes an outer casing, a reverse osmosis tube, a side cap, and an outlet tube. The outer casing includes an outer tube having a first inlet for water and a first outlet, an inner tube mounted inside the outer tube and including a number of holes defined in a periphery of an end thereof, and a water-permeable layer mounted between the inner tube and the outer tube. The reverse osmosis tube is mounted in the inner tube and includes a second inlet for water from the holes of the inner tube and adjacent to the end of the outer tube. The reverse osmosis tube further includes a second outlet for pure water. The side cap is mounted to seal a first end of the outer casing and includes a first electric rod to interconnect the outer tube with a positive power connection and a second electric rod to interconnect the inner tube with a negative power connection. The outlet cap is mounted to seal the other end of the outer casing and includes a third outlet communicated with the second outlet for pure water and a flood hole for outputting impure water. When power is supplied to the positive power connection and the negative power connection, water that enters a space between the inner tube and the outer tube is electrolyzed such that negative ionic water is outputted via the first outlet of the outer tube, and cationic water is passed through the reverse osmosis tube to proceed with acid wash on the reverse osmosis tube and then outputted via the flood hole of the outlet cap.

6 Claims, 3 Drawing Sheets

WATER TREATING DEVICE

BACKGROUND OF THE INVENTION

1. Field of the Invention

The present invention relates to a water treatment device that may produce ionic water and reverse osmosis pure water.

2. Description of the Related Art

A wide variety of water treating devices has heretofore been provided. Examples of which are: Taiwan Utility Model Publication No. 200827 that discloses an ionic water generator, Taiwan Utility Model Publication No. 261134 that discloses a device for producing electrolytic ionic water, etc. Water can also be treated by reverse osmosis method. These treating devices only treat water by a single method. The present invention is intended to provide an improved design in this regard.

SUMMARY OF THE INVENTION

It is a primary object of the present invention to provide an improved water treatment device that may produce ionic water or proceeding with reverse osmosis process to thereby produce reverse osmosis pure water.

It is another object of the present invention to provide a water treatment device in which the residual cationic water (acid water) generated during production of negative ionic water is guided to proceed with acid wash on a reverse osmosis tube to thereby oppress growth of bacteria, lengthen the period of life of the reverse osmosis tube, and improve purity of drinking water.

A water treating device in accordance with the present invention comprises an outer casing, a reverse osmosis tube, a side cap, and an outlet tube. The outer casing includes an outer tube having a first inlet for water and a first outlet, an inner tube mounted inside the outer tube and including a plurality of holes defined in a periphery of an end thereof, and a water-permeable layer mounted between the inner tube and the outer tube.

The reverse osmosis tube is mounted in the inner tube and includes a second inlet for water from the holes of the inner tube and adjacent to the end of the outer tube. The reverse osmosis tube further includes a second outlet for pure water. The side cap is mounted to seal a first end of the outer casing and includes a first electric rod to interconnect the outer tube with a positive power connection and a second electric rod to interconnect the inner tube with a negative power connection. The outlet cap is mounted to seal the other end of the outer casing and includes a third outlet communicated with the second outlet for pure water and a flood hole for outputting impure water.

When power is supplied to the positive power connection and the negative power connection, water that enters a space between the inner tube and the outer tube is electrolyzed such that negative ionic water is outputted via the first outlet of the outer tube, and cationic water is passed through the reverse osmosis tube to proceed with acid wash on the reverse osmosis tube and then outputted via the flood hole of the outlet cap.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
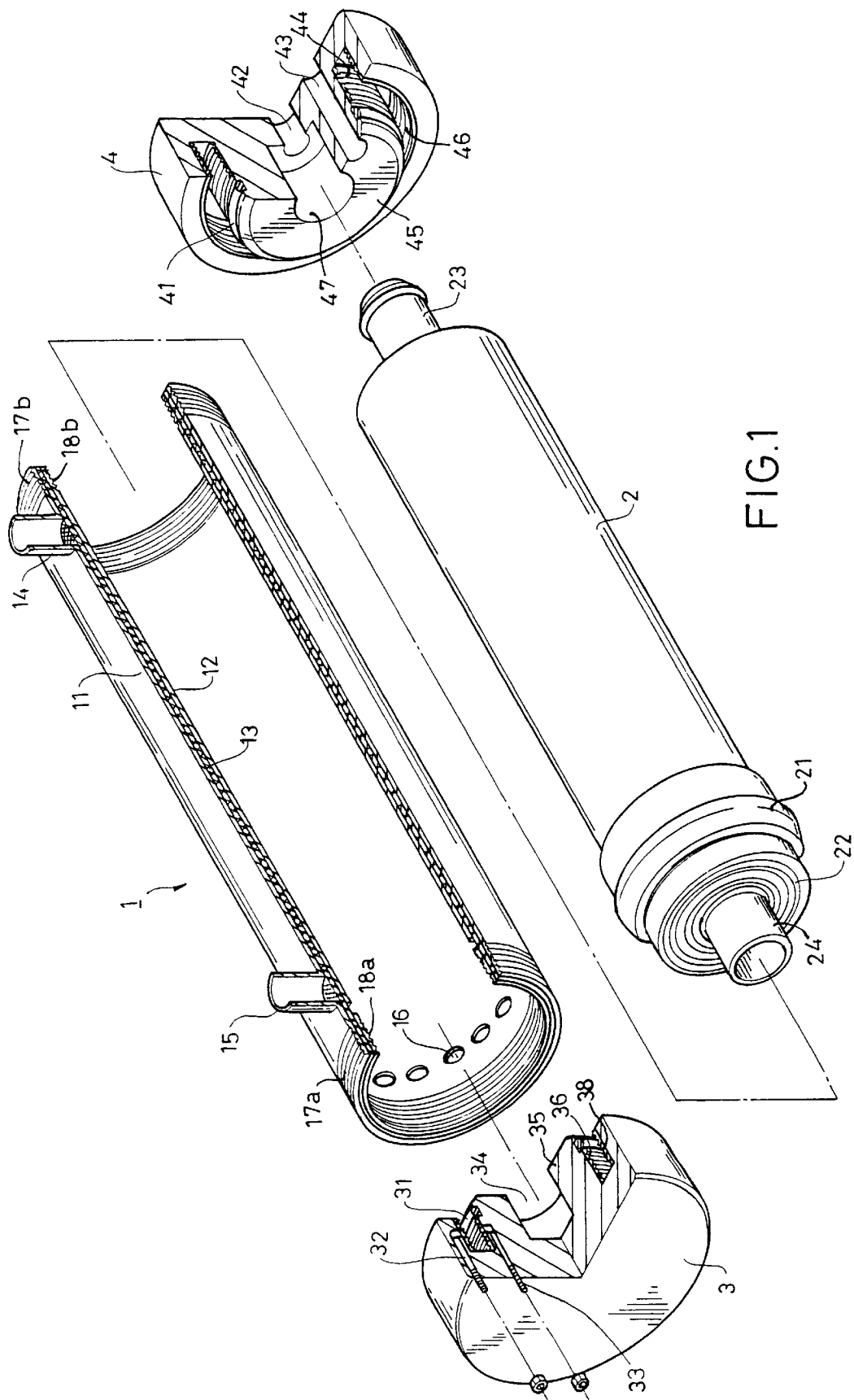
FIG. 1 is an exploded perspective view of a water treating device in accordance with the present invention.
Figure 2:
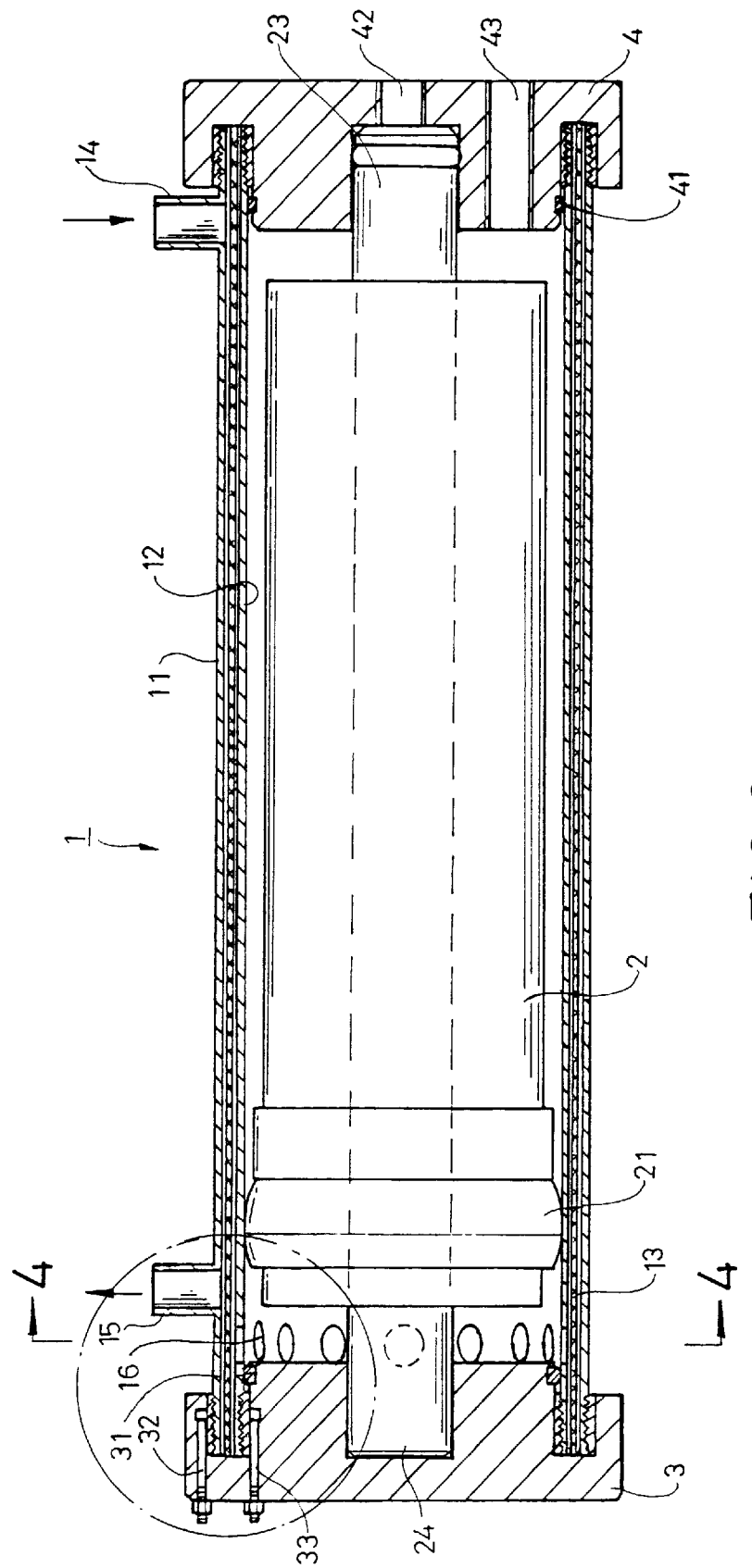
FIG. 2 is a longitudinal sectional view of the water treating device.

Referring to FIGS. 1 and 2, a water treating device in accordance with the present invention generally includes an outer casing assembly 1, a reverse osmosis tube 2, a side cap 3, and an outlet cap 4. The outer casing 1 include an outer tube 11, an inner tube 12, and a water-permeable layer 13 between the outer tube 11 and the inner tube 12. The outer tube 11 is made of metal, e.g., stainless steel, titanium-platinum alloy, etc. The water-permeable layer 13 may be made of non-woven cloth. Thus, a flow path for water is formed from the outer tube 11 to the inner tube 12. The outer tube 11 further includes an inlet 14 and an outlet 15. The inner tube 12 includes a plurality of holes 16 defined in a periphery of an end thereof that is adjacent to the outlet 15. Water treated by a previous filtering stage is introduced into the inlet 14 by a pressurizing pump. Alternatively, water may be fed into the inlet 14 by gravity; e.g., water can be fed from a tank on a water tower located on top of a building.

Figure 4:
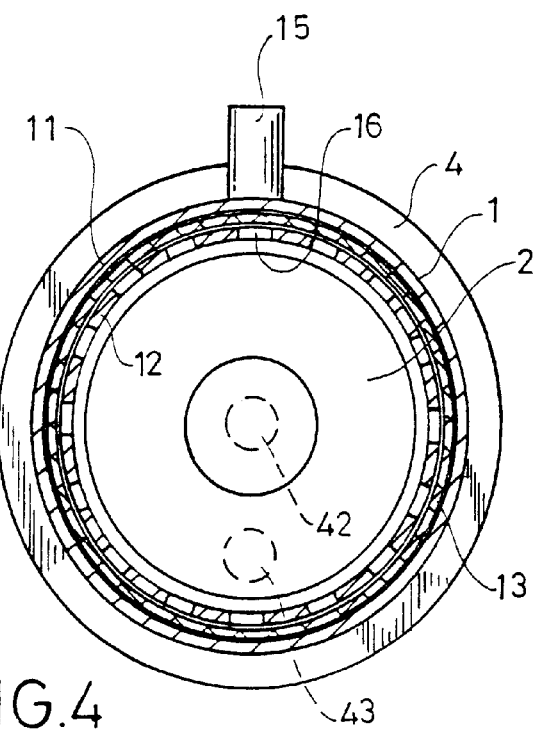
FIG. 4 is a sectional view taken along line 4—4 in FIG. 2.

The reverse osmosis tube 2 is mounted in the inner tube 12 (FIGS. 2 and 4) and may be of a conventional structure. The reverse osmosis tube 2 includes an inlet 22 and an outlet 23. A first anti-leak ring 21 is mounted between an inner periphery of the inner tube 12 and the inlet 22 thereof to assure water is entered via the inlet 22 and outputted via the outlet 23.

Figure 3:
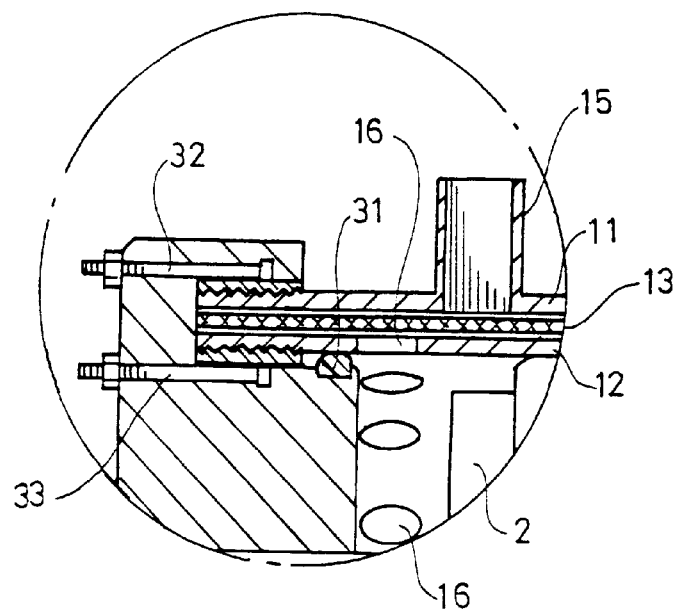
FIG. 3 is an enlarged sectional view illustrating detailed structure encircled by a circle in FIG. 2.

The side cap 3 is securely mounted to seal an end of the outer casing 1. In this embodiment, as shown in FIG. 1, the side cap 3 includes a stub 35 defined in an inner side thereof, and an inner threading 38 is defined in an inner periphery of the side cap 3 for threading engagement with an outer threading 17a defined in an outer periphery of a first end of the outer tube 11 while an outer threading 36 is defined in an outer periphery of the stub 35 for threading engagement with an inner threading 18a defined in an inner periphery of a first end of the inner tube 12. The stub 35 may include a receptacle 34 for securely receiving a protruded end 24 of the reverse osmosis tube 2. In addition, a second anti-leak ring 31 is provided on the outer periphery of the stub 35 for sealing. As shown in FIG. 3, the side cap 3 includes a first electric rod 32 for interconnecting the outer tube 11 with a positive power connection (not shown) and a second electric rod 33 for interconnecting the inner tube 12 with a negative power connection (not shown). As a result, when the power is on, the water that is introduced into the space between the inner tube 12 and the outer tube 11 is electrolyzed, and the negative ionic water is outputted via the outlet 15 to provide ionic water. The residual cationic water enters the reverse osmosis tube 2 via the holes 16 to proceed with acid wash on the reverse osmosis tube 2 and then outputted via a flood hole 43 in the outlet cap 4, which will be described later. Thus, the growth of bacteria is oppressed, the life period of the reverse osmosis tube 2 is lengthened, and the purity of the water is improved. When the power is off, water that enters the reverse osmosis tube 2 is treated by normal reverse osmosis procedure, and pure water is outputted with an outlet 42 in the outlet cap 4, while impure water is outputted by the flood hole 43 in the outlet cap 4.

The outlet cap 4 is securely mounted to seal the other end of the outer casing 1. In this embodiment, as shown in FIG.

1, the outlet cap 4 includes a stub 45 defined in an inner side thereof, and an inner threading 46 is defined in an inner periphery of the outlet cap 4 for threading engagement with an outer threading 17b defined in an outer periphery of a second end of the outer tube 11 while an outer threading 44 is defined in an outer periphery of the stub 45 for threading engagement with an inner threading 18b defined in an inner periphery of a second end of the inner tube 12. The stub 45 may include a receptacle 47 for securely receiving the outlet 23 of the reverse osmosis tube 2. The receptacle 47 is communicated with the outlet 42 for outputting pure water from the outlet 23 of the reverse osmosis tube 2. The flood hole 43 is provided in the outlet cap 4 in an eccentric position for outputting impure water or cationic water, as mentioned above. In addition, a third anti-leak ring 41 is provided on the outer periphery of the stub 45 for sealing.

According to the above description, it is appreciated that in the water treating device of the present invention cationic water is used to proceed with acid wash on the reverse osmosis tube during production of ionic water. In addition, the water treating device can also be used to produce pure water by reverse osmosis process.

Although the invention has been explained in relation to its preferred embodiment, it is to be understood that many other possible modifications and variations can be made without departing from the spirit and scope of the invention as hereinafter claimed.

What is claimed is:

1. A water treating device, comprising:

an outer casing including a first end, a second end, an outer tube having a first inlet for water and a first outlet, an inner tube mounted inside the outer tube and including a plurality of holes defined in a periphery of an end thereof, and a water-permeable layer mounted between the inner tube and the outer tube, a reverse osmosis tube mounted in the inner tube and including a second inlet for water from the holes of the inner tube and adjacent to the end of the outer tube, the reverse osmosis tube further including a second outlet for pure water, a side cap mounted to seal the first end of the outer casing and including a first electric rod adapted to interconnect the inner tube with a positive power connection and a second electric rod adapted to interconnect the outer tube with a negative power connection, and an outlet cap mounted to seal the second end of the outer casing and including a third outlet communicating with the second outlet for outputting pure water and a flood hole for outputting impure water, whereby when power is supplied to the positive power connection and the negative power connection, water that enters a space between the inner tube and the outer tube is electrolyzed such that negative ionic water is outputted via the first outlet of the outer tube, and cationic water is passed through the reverse osmosis tube to proceed with acid wash on the reverse osmosis tube and then outputted via the flood hole of the outlet cap.

2. A water treating device according to claim 1, wherein:

the outer tube has an outer threading at the first end;

the inner tube has an inner threading at the first end;

the side cap includes a first stub facing the first end of the outer casing, the first stub having a first threading for engagement with the inner threading of the inner tube; and the side cap includes a second threading for engagement with the outer threading of the outer tube.

3. A water treating device according to claim 2, wherein:

the inner tube has a first anti-leak ring mounted between an inner periphery of the inner tube and the second inlet; and the first stub of the side cap has a second anti-leak ring disposed on an outermost edge.

4. A water treating device according to claim 2, wherein:

the reverse osmosis tube has a protruded end at the second inlet; and the first stub has a receptacle for receiving the protruded end of the reverse osmosis tube.

5. A water treating device according to claim 2, wherein:

the outer tube has a threading at the second end;

the inner tube has a threading at the second end; and the outlet cap includes a second stub facing the second end of the outer casing, the second stub being threaded at its periphery for engagement with the second end of the inner tube, and the outlet cap being threaded on an inner surface for engagement with the second end of the outer tube.

6. A water treating device according to claim 5, wherein the second stub has a third anti-leak ring disposed on an outermost edge of the second stub.

* * * * *